United States Patent [19]
Hoffman et al.

[11] 3,789,303
[45] Jan. 29, 1974

[54] METHOD AND APPARATUS FOR SYNCHRONIZING SPLIT-PHASE PCM SIGNALS

[75] Inventors: Eric J. Hoffman; Jack C. Loessi, both of Ellicott City, Md.

[73] Assignee: The United States of America as represented by the Secretary of the Navy, Washington, D.C.

[22] Filed: May 1, 1972

[21] Appl. No.: 248,822

[52] U.S. Cl. ................ 325/321, 178/67, 178/69.5 R
[51] Int. Cl. ................ H04b 1/16
[58] Field of Search . 325/320, 321, 38 R, 323, 324, 325/41, 42; 178/69.5 R, 67, 68; 340/174.1 H, 174.1 A; 329/104

[56] References Cited

UNITED STATES PATENTS

| | | | |
|---|---|---|---|
| 3,626,298 | 12/1971 | Anderson et al. | 325/321 |
| 3,281,806 | 10/1966 | Lawrance et al. | 178/67 X |
| 3,268,824 | 8/1966 | Hinrichs et al. | 325/323 X |
| 3,361,978 | 1/1968 | Fiorini | 325/38 R X |
| 3,417,333 | 12/1968 | Atzenbeck | 178/67 X |

*Primary Examiner*—Charles D. Miller
*Attorney, Agent, or Firm*—R. S. Sciascia; Q. E. Hodges

[57] ABSTRACT

This is a device for resolving ambiguity of the start of a split-phase coded data bit. The device is initially synchronized with the zero crossings or polarity transition points in the coded data. A first integrator integrates the signal over one-half the data bit interval, and holds this value. A second integrator integrates the signal over the successive portion of the data bit interval and these two integrator signals are then compared. When the receiver clock is initially synchronized with a data bit polarity reversal, but not at the start of the data bit interval, the integrated signals will be of the same polarity and the comparator will so indicate this fact. To bring the receiver clock into synchronization with the start of the data bit interval, it is necessary to shift the clock output in time to be synchronized with the next successive polarity reversal or zero crossing. This is accomplished by a counting technique which resolves ambiguity introduced by attendant noise in the data transmission. A counter receives a predetermined number of minimum error signals within a given period of time. These error signals are signals out of the comparator indicating the same polarities for the integrated signals. As noise will sometimes cause this result when the clock is initially properly synchronized, reliability is increased by holding the initial synchronization until a minimum number of error signals are received, indicating the clock is not synchronized.

4 Claims, 3 Drawing Figures

METHOD AND APPARATUS FOR SYNCHRONIZING SPLIT-PHASE PCM SIGNALS

SUMMARY OF THE INVENTION

This invention can be used in any split-phase coded modulation receiving system and has wide application. Its advantage over prior art devices is its simplicity. It brings a receiver clock into synchronization with the start of each data bit interval by merely slipping the phase of the clock. Prior art devices usually employ analog phase lock loop circuits which are sensitive, complex, and bulky or require special decoding systems and timing circuits for synchronizing.

This invention is a unique apparatus and method for solving this synchronization problem that has long concerned producers of data transmission equipment.

The advantage of the invention is its simplicity, minimal number of components, light weight, and utilization of simple digital components thereby maintaining a high reliability.

Initially, a second clock is synchronized with the zero crossings of the data bit stream and has a frequency of twice the data frequency. At this point it is not known whether the second clock is synchronized with the start of the data bit interval or the midpoint of the data bit interval, as the data bit can experience polarity reversal of both points. A first integrator integrates the signal over a period of time equivalent to the second clock pulse interval. This integrated signal is then held while a second integrator integrates the data signal over the next successive second clock's pulse interval. The total integrating time interval is equal to one data bit interval. A first clock output is timed to the data interval and is keyed to the second clock, but at half the frequency of the second clock. The output of the first integrator which has been held is then compared with the second integrator output.

When the pulse is initially synchronized with the start of the data bit interval, the comparator output will indicate the integrated output signals are of opposite polarity. In this case, the first clock is maintained at its initial synchronization, at the start of the data bit interval and the reception of the data can be started.

When the comparator indicates that the integrator signal outputs are of the same polarity, an error signal is produced by the comparator. This error signal is counted relative to the second clock output. A phase shifter connected to the first clock shifts the phase of the first clock to the start of the data bit interval responsive to a predetermined number of comparator error signals being received at the counter within a predetermined number of pulses of the second clock.

In the case of the data transmission accompanied by noise, the noise level can be higher or lower than the signal strength and of opposite or the same polarity. Where the noise is of the opposite polarity and stronger than the data signal, an error signal will be produced by the comparator even though the clock is initially synchronized at the start of the data bit interval. The counter is used to avoid shifting the clock when the comparator output error signal is due solely to this noise. The counter counts a minimum number of error signals, usually four, so that the reliability of the data signal arises exclusively from non-synchronization between the clock and the start of the data bit interval is increased to an acceptable factor.

The counter is also timed to the second clock which runs at twice the frequency of the first clock. The count on the counter is set back to zero for each predetermined number of clock pulses received from the second clock so that the minimum number of predetermined error signals must be received within a set period of time before the first clock is phase shifted in time. In this way, a cumulative number of comparator error signals arising from noise over a long period of time will not erroneously cause the clock to shift in phase.

DESCRIPTION OF THE INVENTION

Figure 1A:
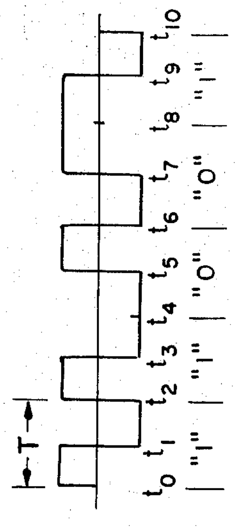
FIG. 1*a* shows a data bit stream of split-phase coded pulse modulated data bits.

A stream of split-phase coded pulse modulated data is shown in FIG. 1*a*. Each single data bit has a bit interval as shown for the first data bit "1" between $t_0$ and $t_2$. The split-phase coded pulse modulated (PCM) data bit is characterized by a polarity reversal with the data bit interval T. In the case of a "1" the polarity is positive for half the data bit interval, and negative in the last portion of the data bit interval. In the case of a "0" the polarity is initially negative in the first half of the data bit interval and positive for the second half of the data bit interval. It can be seen by inspection that simply synchronizing the receiver clock, at a zero crossing point, will not identify or synchronize the receiver clock with the start of the data bit interval. The receiver clock might be synchronized at a point in time $t_6$ which would be the start of the data bit "0" between $t_6$ and $t_8$, but it also might be synchronized at $t_1$ which would be within data bit "1."

This system resolves this ambiguity by initially synchronizing a clock with a zero crossing and then shifting the clock in phase or holding its initial synchronization when indication is received that the clock is either not in sync or in sync respectively.

Figure 2:
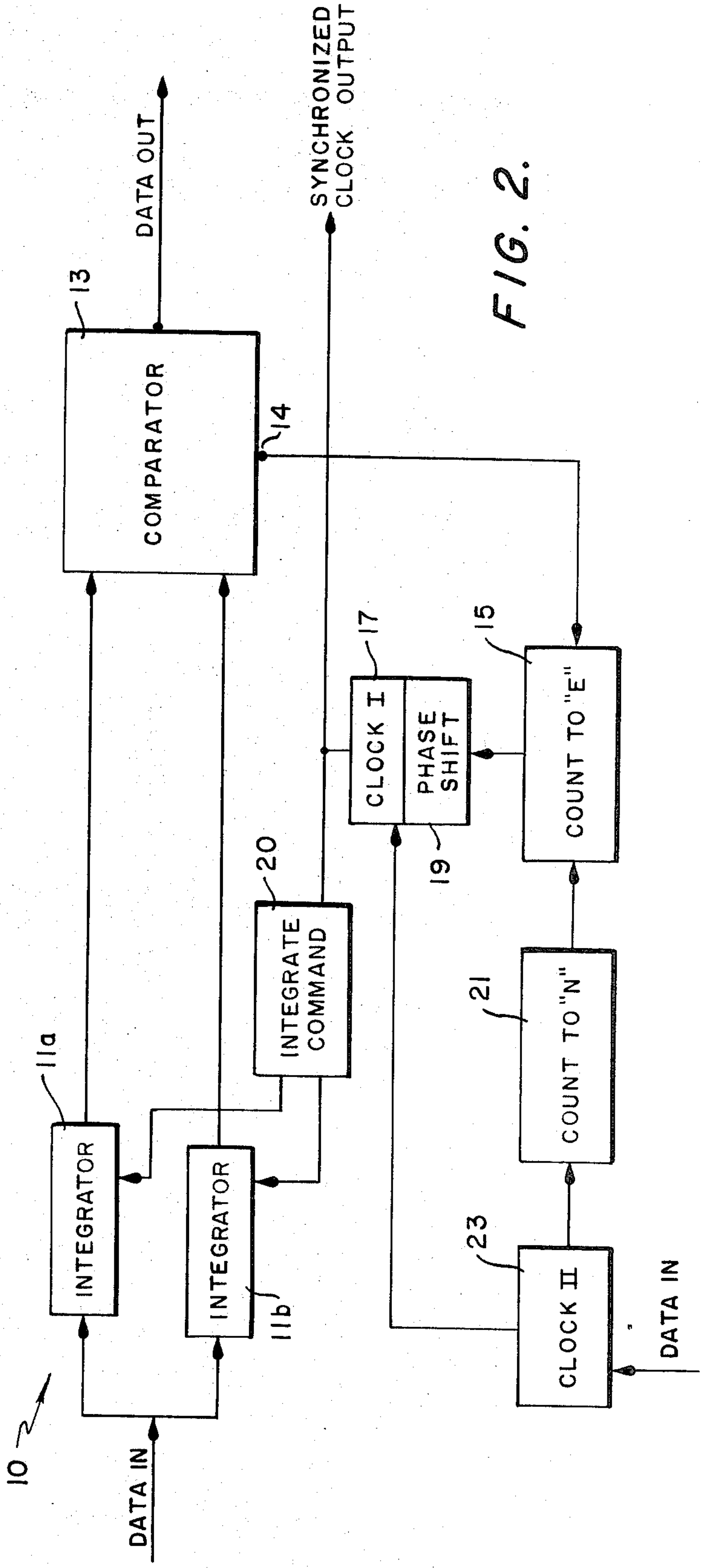
FIG. 2 shows a system in block form for synchronizing the receiver with the split-phase coded pulse modulated signals.

The synchronizing circuitry is shown in FIG. 2 and designated generally by numeral 10. Within the synchronizer are integrators 11*a* and 11*b*, each connected in parallel to the data input. The output of each integrator is connected to comparator 13 which produces an error signal at its output terminal 14 when the integrated output signals are of the same polarities. Additionally, the comparator includes a data out terminal 16 for transmitting the data through to a data receiver.

The synchronizer includes two clocks; clock I designated by numeral 17 and clock II designated by numeral 23. Clock I is tied to the output of clock II and is half the frequency of clock II. Clock I additionally tied to integrators 11*a* and 11*b*. A counter 15 is connected to the error signal output 14 of comparator 13 and cumulatively counts to a number "E" the error signals from the comparator. A second counter 21 is connected to clock II and cumulatively counts the number of clock pulses up to a predetermined number "N." The output "N" of counter 21 is connected to counter 15. Counter 21 resets to 0 when it reaches "N." The logic of counter 15 is such that it must receive a predetermined number "E" of error signals from comparator 13 before counter 21 reaches "N" before it will transmit a phase shift signal to phase shifter 19.

When "E" is reached prior to "N" being reached by counter 21, the signal is transmitted from counter 15 to the phase shifter 19 which causes the clock I, numeral 17, to shift in phase half of a bit interval, thereby synchronizing clock I with the start of a data bit. In the case where counter 15 does not count "E" within the "N" count of counter 21, the clock I, numeral 17, is held at its initial synchronization which is then the start of a data bit interval.

OPERATION OF THE DEVICE

Figure 1B:
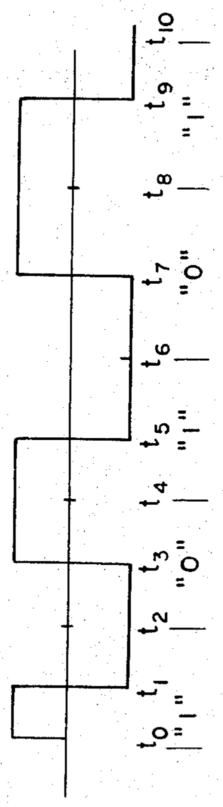
FIG. 1*b* shows a checkerboard pattern of split-phase coded pulse modulated data bits which are initially sent prior to transmission of the data, to synchronize the receiver with the start of the data bit interval.

Prior to the transmission of a message, the data stream is loaded with checkerboard patterns as shown in FIG. 1*b* where data bits "1" and "0" are alternated. Clock II, numeral 23, is randomly synchronized with a zero crossing within the data stream of FIG. 1*b*, at time $t_1$ for example.

Each of the integrators 11*a* and 11*b* alternately integrate the data input signal in response to the clock pulse output of clock I, numeral 17, and the integrate command logic 20. The integrate command is used to trigger each of the integrators 11*a* and 11*b*, in response to a pulse from clock I. Where the polarity reversal occurs at midpoint of the data bit interval, the integrate command, upon receiving a clock pulse from clock I will trigger integrator 11*a* and command its operation over one-half a data bit interval. At the half-interval point, the integrate command will turn off integrator 11*a*, whose output is held by comparator 13, and will trigger integrator 11*b*, causing it to operate over the successive half of the data bit interval. Integrator 11*b* would then be turned off responsive to the next clock pulse to the integrate command 20 and a successive integrating cycle would begin.

When the data bit polarity reversal occurs at a point in the data bit other than at the midpoint, the logic of the integrate command would be set up to operate integrator 11*a* over the time interval corresponding to one of the intervals of continuous polarity within the data bit interval and to operate integrator 11*b* over a successive time interval corresponding to the other interval of continous and opposite polarity, within each data bit interval. In this way, the receiver may be synchronized with a polarity coded bit having unequal intervals of polarity within each bit interval.

For the purpose of explaining this invention, each data bit is shown as having equal intervals of continuous polarity with the polarity reversal occurring at the midpoint of a data bit. But this invention may be practiced with the polarity reversal point occurring anywhere in a data bit by establishing the timing logic of the integrate command accordingly.

The integrate command may be eliminated if the clock pulse is the same shape as a data bit (i.e., characterized by two polarity extremes and a zero crossing within the data bit interval). The integrator would then include a trigger circuit responsive to the split-phase clock pulse, triggering 11*a* to integrate the data signal over a first bit interval of continuous polarity. The time over which 11*a* integrates is synchronized to start with the start of the clock pulse and the successive integration by 11*b* is triggered in response to a zero crossing of the clock pulse signalling a polarity reversal. This polarity reversal indicates a successive period of continuous and opposite polarity within a data bit interval defined by a data bit zero crossing and characterized by a period of continuous polarity. The integrators may be actuated so that the integrator 11*a* integrates over the period of time $t_1$ to $t_2$ and integrator 11*b* integrates over the period of time $t_2$ to $t_3$, with each of the periods $t_1$ to $t_2$ and $t_2$ to $t_3$ being defined by a data bit zero crossing and with each integrator output signal being indicative of the data signal polarity during a period of continuous phase, $t_1$ to $t_2$ and $t_2$ to $t_3$, respectively.

The integrators 11*a* and 11*b* are operated cyclically with integrator 11*a* integrating the data input signal over the first portion of the integrating cycle and and holding its value for the comparator 13. Integrator 11*b* then integrates the data input signal over the remaining portion of the data interval and this signal of integrator 11*b* is compared with the signal 11*a*. The comparator compares the signals for similarity or differences in polarity and transmits an error signal to counter 15 if the polarity is the same for both integrated signals.

Counter 21 is cyclical in operation. It counts pulses from clock II until "N" pulses are counted and then resets itself to zero and recounts and resets counter 15 to zero. Counter 15, responsive to receiving "E" error signals from comparator 13 before counter 21 reaches "N," triggers phase shifter 19 to shift clock I an interval of continuous phase thereby synchronizing it with the start of a data interval.

This counting technique is utilized to eliminate any ambiguity introduced by noise. As the noise at any time may exceed the signal and be of opposite polarity, the error signal may be generated when the initial synchronization is at the start of the data bit interval but noise exceeding the data signal and of opposite polarity produces an error signal at terminal 14 of comparator 13.

By withholding the phase shift signal until a minimum number of error signals are received within a predetermined period of time, the reliability of the device is increased and an erroneous shift due to noise is significantly reduced.

As clock II is continuously tied to the data input, the operation of the system is repetitive and continuous to maintain synchronization with the data bit intervals.

What is claimed is:

1. A system for synchronizing a clock with the start of each bit of a split-phase data bit stream, comprising:

a first clock;

a pair of integrators, one integrator receiving one time interval of continuous polarity within a split-phase data bit period and producing a signal indicative of that polarity, and another integrator receiving a consecutive time interval of continuous opposite polarity within a split phase data bit period and producing a signal indicative of that opposite polarity;

a comparator connected to the output of said pair of integrators for comparing the polarity of the signals and producing an error signal when the polarities are the same;

a first counter connected to the output of said comparator to count the error signals;

a phase shifter connected to the output of said first counter and to the input of said first clock far synchronizing said first clock with the start of each split phase data bit in response to a first predetermined number of error signals;

a second clock connected to and having twice the frequency of said first clock to effect the synchronization thereof, said second clock being initially synchronized with the zero crossings of the split phase data bits in the absence of error signals from said comparator; and a second counter connected between said second clock and said first counter, responsive to said second clock for cyclically counting a second predetermined number of clock pulses and resetting said first counter to zero when the number is attained.

2. The synchronization system of claim 1 further including:

integrate command means connected to said pair of integrators responsive to said first clock for triggering said first integrator to integrate each bit over said one interval of continuous polarity and for triggering said second integrator to integrate each bit over said consecutive interval of continuous polarity.

3. A method for synchronizing a clock with the start of each split phase data bit interval in a data stream, comprising the steps of:

comprising cyclically the polarities of the data signal within a data bit interval;

producing an error signal when the signals are of the same polarity;

counting the number of error signals produced by said comparison;

phase shifting a first clock, initially synchronized with a data bit zero crossing to be in synchronization with the start of each data bit interval in response to a predetermined number of comparisons within a predetermined time;

synchronizing intitially a second clock with a zero crossing in the data stream;

triggering said first clock with a pulse from said second clock to run at one-half the rate of said second clock; and integrating the data signals to produce polarity indicative signals corresponding to an interval within each data bit when said bit is of the same polarity.

4. The method of claim 3 wherein said step of phase shifting said first clock further includes the steps of:

holding said first clock at its initial synchronization in absence of said comparison in excess of a predetermined number within a predetermined time; and moving the first clock pulse output an interval equal to one-half the time segment of continuous polarity within a single data bit.

* * * * *